J. H. DWORK.
INLAID TREAD TIRE.
APPLICATION FILED MAR. 14, 1919.
1,381,173. Patented June 14, 1921.
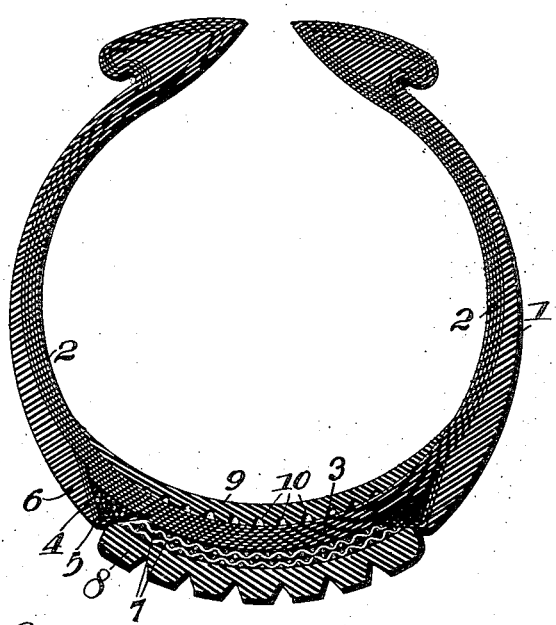
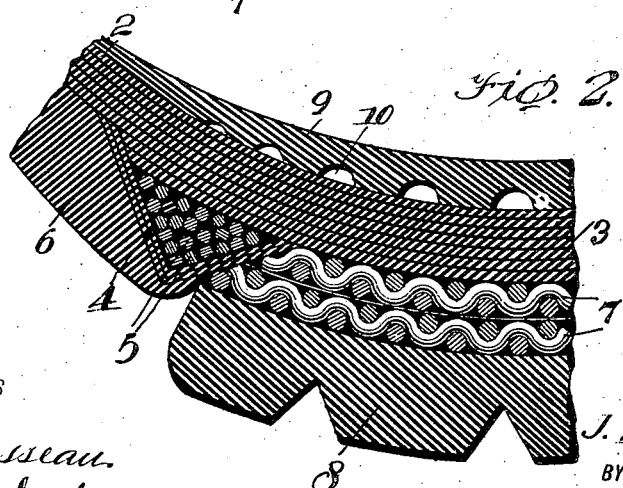

UNITED STATES PATENT OFFICE.

JOSEPH H. DWORK, OF NEWARK, NEW JERSEY.

INLAID-TREAD TIRE.

1,381,173.

Specification of Letters Patent. Patented June 14, 1921.

Application filed March 14, 1919. Serial No. 282,681.

*To all whom it may concern:*

Be it known that I, JOSEPH H. DWORK, a citizen of the United States, and a resident of Newark, in the county of Essex and State of New Jersey, have invented certain new and useful Improvements in Inlaid-Tread Tires, of which the following is a specification.

My invention relates to improvements in tire casings, and it consists in the constructions, combinations, and arrangements herein described and claimed.

The foremost object of my invention is to provide an improved tire casing of a novel construction, the arrangement being such that the danger of puncture is fully guarded against, at the same time preserving the necessary flexibility of the casing.

A further object of the invention is to provide a tire casing of a construction described, including means for preventing the displacement and lateral distortion of the tread by virtue of the stresses on the casing in rounding curves.

Other objects and advantages will appear in the following specification, reference being had to the accompanying drawing in which—

Figure 1 is a cross section of the improved tire casing, and

Fig. 2 is a detailed section of a portion of a tire showing the internal construction including one of the annular ribs for preventing the displacement thereof.

In carrying out my invention, I provide a tire casing 1 of the conventional shape, which includes the inner fabric structure 2. This fabric structure, or canvas which it usually comprises, is thickened at 3 toward the outer periphery of the casing and is suitably shaped to provide a pair of annular ribs 4.

These ribs are V-shaped in cross section substantially as shown, although they may be of other shapes and still perform the functions for which they are intended. In order to construct the body of these ribs, strands 5 of any suitable material are embedded in the rubber. These strands run longitudinally of the ribs, that is to say, they encircle the tire casing.

The rubber sides of the casing are gradually thickened at 6 so as to include the ribs and assist in firmly supporting them. This arrangement also gives the casing a smooth and shapely appearance. Breaker strips 7 of canvas and rubber are laid next to the enlarged portion 3 and are disposed between the annular ribs 4 as clearly shown in Fig. 1.

A tread 8 of suitable design and material is next fixed in place on the breaker strips, and the whole forms one firm and homogeneous structure. The function of the breaker strips is to provide a strong lining between the portions 3 and 8 of the casing, that is not easily punctured but at the same time is flexible and does not impair the resiliency of the casing.

An inner cellular lining 9, thick in the middle and tapering to thin edges at the sides, is suitably incorporated in the casing. This lining may be made separable if desired, although in the preferred construction of the tire, it will be formed integrally therewith by methods known to the art. This lining contains many cells 10 running both longitudinally and transversely. This inner lining with its structure of cells, is intended to add materially to the resiliency of the casing and also provides a facing for an inner tube when the tire is in use.

It will be understood at once that in a tire casing of the character shown and described, the annular ribs 4 play the important part of preventing the lateral displacement of the tread, particularly in circumstances where the vehicle to which the casing is applied rapidly turns a curve. The fundamental purpose of this tire casing structure is, to keep the parts of the tread evenly balanced, that is to say, to prevent distortion of the tread on the tire casing in the circumstances mentioned above. It can also be readily seen that when it becomes necessary to renew the tread, the old worn tread can be taken off with comparative ease and a new one applied by commonly known methods.

While the construction and arrangement of the parts of the tire casing, especially the inlaid tread, is that of a generally preferred form, obviously modifications and changes may be made without departing from the spirit of the invention or the scope of the claims.

I claim:

1. A tire casing including a fabric structure thickened toward the outer periphery and including enlarged portions embodied therein, providing a pair of spaced, circumferentially disposed ribs; means embodied in said ribs running longitudinally thereof for reinforcing them, suitably constructed breaker strips applied to the casing at said thickened portion between the ribs, a tire tread applied to the casing on said breaker strips, said breaker strips and tread being prevented from lateral displacement by virtue of said ribs; and a cellular inner lining increasing the thickness of the casing and adding a facing for an inner tube.

2. A tire casing including a fabric structure thickened toward the outer periphery, spaced circumferential ribs included in said thickened structure, with reinforcing means running longitudinally of the ribs; a covering of rubber or the like applied to the casing and thickened toward said ribs to include and conceal them, breaker strips applied to the casing between said ribs, and a tread structure applied to the breaker strips.

JOSEPH H. DWORK.